(12) United States Patent
Alayamani et al.

(10) Patent No.: US 11,288,614 B2
(45) Date of Patent: Mar. 29, 2022

(54) ROLE-BASED ASSET TAGGING FOR QUANTIFICATION AND REPORTING OF ASSET PERFORMANCE

(71) Applicant: Caterpillar Inc., Peoria, IL (US)

(72) Inventors: Arun Prasad Alayamani, Chennai (IN); Allen J DeClerk, Princeton, IL (US); Chad Timothy Brickner, Dunlap, IL (US); Nicholas Adam Hanauer, Washington, IL (US); Chetna Varman, Chennai (IN); Vishnu Gaurav Selvaraj, Chennai (IN); Timothy Edward Noon, Morton, IL (US); Eric J. Spurgeon, Washington, IL (US); Bradley K. Bomer, Pekin, IL (US); Umasri Devireddy, Chennai (IN)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/889,569

(22) Filed: Jun. 1, 2020

(65) Prior Publication Data

US 2021/0374633 A1 Dec. 2, 2021

(51) Int. Cl.
*G06Q 10/06* (2012.01)
*G06F 3/0482* (2013.01)
*G07C 5/00* (2006.01)
*G07C 5/08* (2006.01)

(52) U.S. Cl.
CPC ....... *G06Q 10/0639* (2013.01); *G06F 3/0482* (2013.01); *G06Q 10/063114* (2013.01); *G07C 5/008* (2013.01); *G07C 5/0808* (2013.01)

(58) Field of Classification Search
None
See application file for complete search history.

(56) References Cited

U.S. PATENT DOCUMENTS

| 2002/0059320 | A1 | 5/2002 | Tamaru | |
| 2008/0011839 | A1* | 1/2008 | Noll | G06Q 10/08 235/384 |
| 2008/0084332 | A1 | 4/2008 | Ritter | |
| 2009/0096637 | A1* | 4/2009 | Olson | H04L 67/12 340/993 |

(Continued)

FOREIGN PATENT DOCUMENTS

KR 20190111585 10/2019

OTHER PUBLICATIONS

Written Opinion and International Search Report for International Patent Appln No. PCT/US2021/021093, dated Jun. 29, 2021 (13 pgs).

*Primary Examiner* — Sujay Koneru
(74) *Attorney, Agent, or Firm* — Xsensus LLC (57) ABSTRACT

Performance quantifying and reporting for machine assets includes storing, in a work plan, asset tag assignments for a plurality of assets, and receiving location information, for example, indicative of a segment of a work cycle, being worked on by an asset. Attributes of an asset, including an inferred occurrence or non-occurrence of an asset-to-asset interaction, are based upon the location information and matching of role-based asset tags between or amongst assets. Performance history of the asset is quantified and reported based on the identified attributes for displaying, on a user interface, machine asset performance metrics.

16 Claims, 7 Drawing Sheets

(56) References Cited

U.S. PATENT DOCUMENTS

| | | | |
|---|---|---|---|
| 2013/0002455 A1* | 1/2013 | Koehrsen | G08G 1/20 340/989 |
| 2013/0035978 A1* | 2/2013 | Richardson | G06Q 30/0283 705/7.27 |
| 2015/0066548 A1* | 3/2015 | Salvaggio | G06Q 10/063 705/7.11 |
| 2015/0081161 A1* | 3/2015 | Chapman | G06Q 10/08 701/31.5 |
| 2016/0063407 A1* | 3/2016 | Bak | G06Q 10/0639 705/7.38 |
| 2016/0234259 A1* | 8/2016 | Talmaki | B60P 1/00 |
| 2016/0292619 A1* | 10/2016 | Mendiola | H05K 7/00 |
| 2016/0358479 A1* | 12/2016 | Riedelsheimer | G08G 1/0145 |
| 2017/0039786 A1* | 2/2017 | DeVore | G07C 5/0816 |
| 2017/0076233 A1 | 3/2017 | Finn | |
| 2017/0124505 A1* | 5/2017 | Nakfour | G01C 21/3415 |
| 2017/0284072 A1* | 10/2017 | Jensen | G07C 5/008 |
| 2019/0087790 A1* | 3/2019 | Flood | G07C 5/02 |
| 2019/0213509 A1* | 7/2019 | Burleson | G06Q 10/06393 |

\* cited by examiner

EDIT JOBSITE

Selected Assets: 9　View All　① Set Location & Name　② Select Assets　③ Create Zones　④ Assign Schedule　⑤ Review & Confirm Enter Estimate Value　50　US Tons

- Not Subscribed
  AXT00001

- Not Subscribed
  AXT00100

- Not Subscribed
  AY400155

- Not Subscribed
  AY400157

- Not Subscribed
  AYT00001

- Not Subscribed
  B1N00309

- Subscribed
  B1N00607

- Not Subscribed
  B1P96031

- Not Subscribed
  B1P96032

- Not Subscribed
  B8P00202

- Not Subscribed
  B9200001

— 224

< Asset Tags
Hauler - Load & Haul　Loader
Load & Haul　Support
Load Out

— 212

- Not Subscribed
  B9800250

- Not Subscribed
  B9800252

- Not Subscribed
  B9H00108

218 ⟵

- Not Subscribed
  B9H00862

200 ⟵

[Next]　[Previous]

FIG. 7 and

ROLE-BASED ASSET TAGGING FOR QUANTIFICATION AND REPORTING OF ASSET PERFORMANCE

TECHNICAL FIELD

The present disclosure relates generally to performance evaluation and reporting for machine assets, and more particularly to identifying attributes of an asset in a work cycle based on an assigned asset tag.

BACKGROUND

Assets deployed at a work site, such as a mining, construction, quarrying, or other work site are assigned to different roles and specific applications based on the type of operations involved. In a typical example, loader machines can be used to dig, carry, and load material to other machines such as off-highway haul trucks, crushers, or on-highway trucks. The off-highway haul trucks can be used to transport raw material from one location at a work site to another for further processing or placement into on-highway haul trucks. Operations managers oversee the implementation of machine operations, and are constantly seeking further sources of information, insight into relationships among machine activities, and operating strategies for improving efficiency.

There are a variety of software applications commercially available that enable operations managers to monitor locations, activities, and performance metrics for the various assets. It has proven useful to be able to monitor assets in real time, as well as by way of performance metrics that aggregate activity information from the various machines, or for the machines as individuals. One known example of a project management system for a work site is known from United States Patent Application Publication No. 2017/0284072 to Jensen. In Jensen, a controller receives data from a collection unit, and analyzes the data to determine a duty cycle of an individual machine. The operation of the machine is classified based on the duty cycle, such that the controller can provide one or more resources for improving productivity of the machine based on the classification.

SUMMARY OF THE INVENTION

In one aspect, a method of performance reporting for machine assets includes storing, in a work plan, role-based asset tag assignments for a plurality of machine assets, and receiving location information for the plurality of machine assets, produced during execution of work cycles at a work site. The method further includes inferring an occurrence or a non-occurrence of an asset-to-asset interaction, based on the location information and the role-based asset tag assignments for the plurality of machine assets. The method still further includes populating an operations history for one of the plurality of machine assets based on the occurrence or non-occurrence of the asset-to-asset interaction, and displaying, on a user interface, machine asset performance metrics based on the populated operations history.

In another aspect, a performance reporting system for machine assets includes a user interface including a display, and at least one computer coupled with the user interface. The at least one computer is structured to read, from a machine-readable memory, role-based asset tags for each of a plurality of machine assets, and determine matching of role-based asset tags amongst machine assets that are proximate, at times, during execution of work cycles at a work site. The at least one computer is further structured to determine, inferentially, the occurrence or non-occurrence of an asset-to-asset interaction based upon the matching of the role-based asset tags amongst the machine assets. The at least one computer is still further structured to populate, on a machine-readable memory, an operations history for one of the plurality of machine assets based on the occurrence or non-occurrence of the asset-to-asset interaction, and output display commands to the display in the user interface to display machine asset performance metrics based on the populated operations history.

In still another aspect, a machine system includes a plurality of machine assets each structured for material handling according to a predefined asset role during execution of work cycles at a work site. The machine system further includes a performance reporting system including at least one computer structured to receive location information for each of the plurality of machine assets during execution of the work cycles, and read, from a machine-readable memory, role-based asset tags for each of the plurality of machine assets. The at least one computer is further structured to determine, inferentially, the occurrence or non-occurrence of an asset-to-asset interaction based upon matching of role-based asset tags amongst machines that are proximate, at times, during execution of the work cycles. The at least one computer is still further structured to populate an operations history for one of the plurality of machine assets based on the occurrence or non-occurrence of the asset-to-asset interaction, and output display commands to a display in a user interface to display machine asset performance metrics based on the populated operations history.

In still another aspect, a method of quantifying performance of an asset includes configuring, in a work plan, a plurality of role-based asset tag assignments for the asset, and identifying, from the plurality of asset tag assignments, an asset tag assigned to the asset in a work cycle at a work site. The method still further includes identifying a location of the asset during execution of the work cycle. The method still further includes iteratively performing the following operations until the work cycle is complete: determining a segment of the work cycle being worked on by the asset, based on the asset location and the asset tag, identifying a plurality of attributes associated with the asset while the asset is located within the segment, quantifying performance history of the asset based on the identified attributes of the asset while the asset is located within the segment, and displaying, on a user interface, asset performance metrics based on the quantified performance history of the asset.

DETAILED DESCRIPTION

Figure 1:
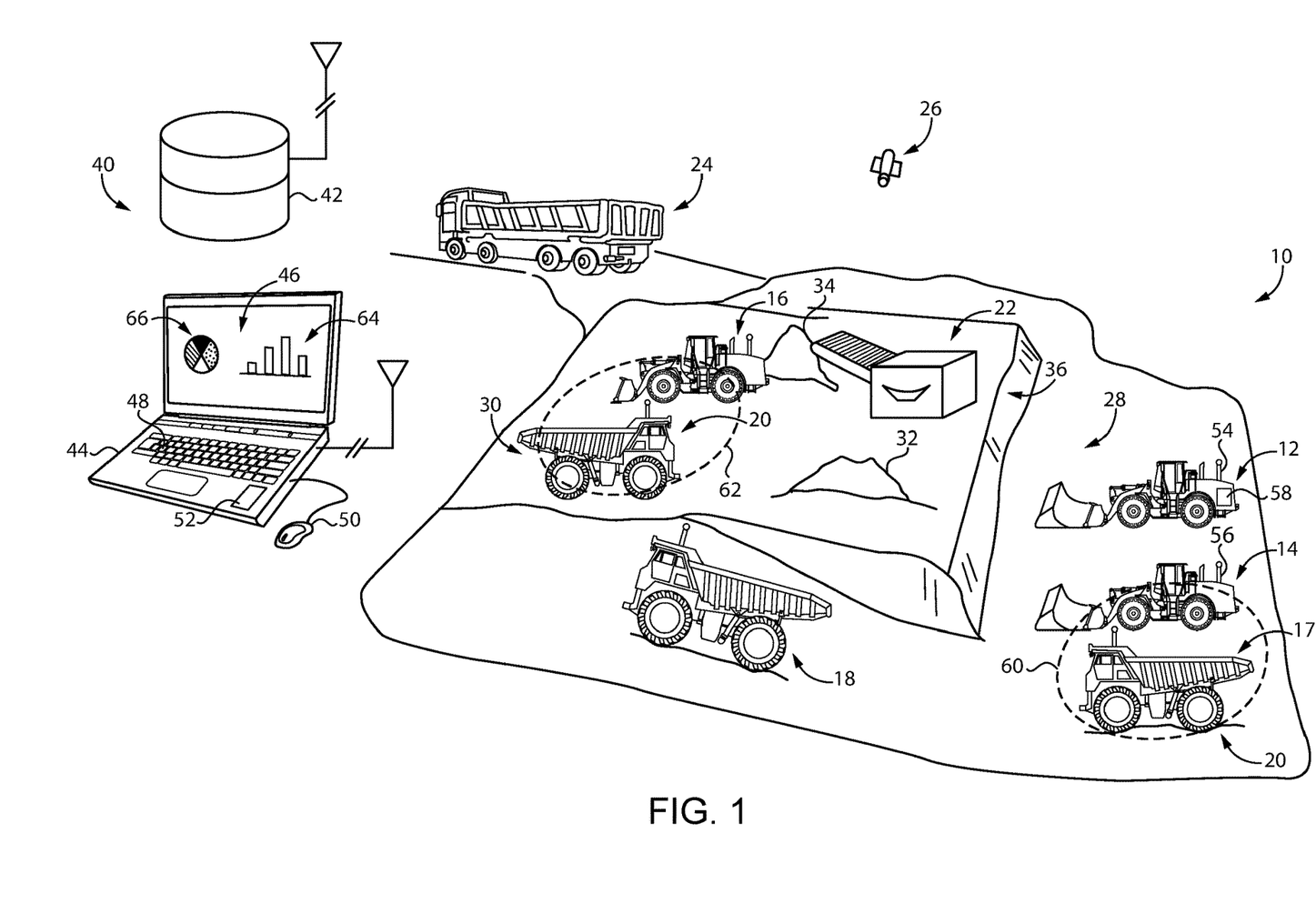
FIG. 1 is a diagrammatic illustration of a machine system, according to one embodiment.

Referring to FIG. 1, there is shown a machine system 10 according to one embodiment, and including a plurality of machine assets each structured for material handling according to a predefined asset role during execution of work cycles at a work site. The plurality of machine assets can include a variety of different machine assets including, for example, a first loader machine or wheel loader 12, a second loader machine or wheel loader 14, a third loader machine or wheel loader 16, a first off-highway haul truck 17, a second off-highway haul truck 18, and a third off-highway haul truck 20. Machine assets at the work site may also include a crusher 22, and an on-highway haul truck 24. Other machine assets could include skid steer loaders, motor graders, water trucks, dozing tractors, service vehicles, fuel trucks, and still others. At the work site, first and second loaders 12 and 14 may work at a first location or pit 28, to load a material extracted from a face 36 into the various haul trucks for carrying to another location such as a yard or lot 30 where crusher 22 is located. Haul trucks 17, 18, and 20 can dump material into a first pile 32, with loader 16 operated to load material from first pile 32 into crusher 22, which outputs processed material into second pile 34. Loader 16, or other loaders or the like, can load on-highway haul truck 24 with processed material from second pile 34.

The example work site is shown in the context of a quarry, but could be any of a variety of other work sites such as a mine, a waste handling site, a construction site, a roadbuilding site, or still others. As noted above, it can be desirable to monitor, quantify, evaluate, and optimize performance efficiency of the various assets in machine system 10. Activities of the assets in machine system 10 it can be desirable to track in this general manner can include a number of material handling activities such as loading activities, dumping activities, distances traveled, fuel consumed, load capacity percentages, and still other factors relating to the general operating efficiency of machine system 10. As will be further apparent from the following description, machine system 10 is configured for monitoring, quantifying, and reporting machine activities according to these and other performance metrics with reduced incidence of false positives.

Each of the assets in machine system 10 may be configured for location tracking, receiving signals from global positioning system (GPS) satellites, one of which is shown at 26, or by way of a local positioning system. Each of the machine assets in machine system 10 can further be configured to transmit data collected by the respective asset, including location data, activity data such as loads obtained, loads dumped, distance travelled, fuel consumed, and others to an off-board repository for later performance quantification, aggregation, and reporting, for example. Loader 12 can include a transmitter/receiver 54 for receiving location information, control commands, and other information, and also for transmitting, at least periodically, such data. Loader 14 can also include a transmitter/receiver 56 for analogous purposes. Each of off-highway haul trucks 17,18 and 20, and loader 16 may be similarly equipped.

In some implementations, the machine assets in machine system 10 may be configured differently from one another for on-board data acquisition, and could include machines provided with native on-board monitoring equipment, or monitoring equipment later provided as an add-on feature. Loader 12 is shown having on-board monitoring systems 58, which can acquire data as discussed herein as to fuel consumption, operation of an implement system, or still other attributes. Loader 14, in contrast, may include on-board monitoring equipment only in the nature of transmitter/receiver 56 for acquiring and reporting location data. Loader 12 could be understood as an advanced productivity machine, and loader 14 understood as a telematics only machine, for example. As will be further apparent from the following description, machine system 10 is structured to monitor, quantify, and report machine performance data for both advanced productivity machines and telematics only machines. Embodiments are contemplated where all of the assets in machine system 10 are telematics only machines, all of the assets in machine system 10 are advanced productivity machines, as well as implementations having any combination of the two.

Machine system 10 further includes a performance quantifying and reporting system 40. Performance quantifying and reporting system 40 (hereinafter "system 40") includes apparatus for gathering data from the assets of machine system 10, aggregating the data, quantifying the data, and reporting the data. The various functions and capabilities of system 40 can be executed in a single computer located, for instance, at a site management office, located on a mobile device or a laptop computer, on a remote server computer, or distributed amongst any of the various computer systems. In some implementations, some or all of the productivity data could be stored on-board one, or each of, the assets in machine system 10. The software and control logic, in part or in whole, could also be executed upon a computer on an asset of machine system 10. Performance data may be reported in data feeds periodically, or more or less continuously, output from the assets of machine system 10 to system 40. As suggested, data feeds from the individual assets could include raw data, aggregated data, or data otherwise processed prior to feeding to other systems or subsystems of machine system 10.

System 40 is shown in the context of a server computer 42 and a user computer 44. Server computer 42 could store and host data from machine system 10, potentially from other machine systems, and execute the various algorithms further discussed herein for quantifying, aggregating, and reporting performance data. User computer 44 can include an input device 44 such as a keyboard or touch screen, a conventional computer mouse 50, or still other input devices. User computer 44 also includes thereon an electronic control unit 52 that can perform any of the computer-based functions associated with performance quantification and reporting as discussed herein. User computer 44 also includes a display 46 or graphical user interface (GUI) 46 displaying performance metrics, for example a pie chart on-screen graphic 66, and a bar chart on-screen graphic 64. It will be appreciated that display 45 can display any of a great variety of different types of performance metrics in a variety of different forms, including but not limited to the illustrated graphics, charts, tables, line graphs, or still others. Server computer 42, or electronic control unit 52 resident on user computer 44, can output display commands to display 46 to display machine asset performance metrics based on populated operations histories for assets of machine system 10, as further discussed herein.

From FIG. 1 it can be noted that loader 14 and haul truck 17 are within a proximity zone 60. Loader 16 and haul truck 20 are within a proximity zone 62. During execution of work cycles in machine system 10, the various assets may be, at times, in proximity to one another. It has been discovered that by detecting, directly or indirectly, proximity between or amongst assets, and determining what the assets are intended to be doing when in proximity, improved accuracy in quantification and reporting of performance metrics can be achieved. Proximity can be relative, and could be a physical proximity specified by a user or predetermined in system 40. In other words, system 40 could determine assets are within proximity to each other when location information indicates the asset locations are within, say, "X" meters. Proximity can also be determined or inferred based upon what segment of a work cycle a particular asset is performing. For example, a haul truck determined to be empty and available for loading that enters a predefined geofence area or zone, or having crossed a boundary, might be determined to be in proximity to a loader also within that predefined area or having crossed that boundary. In other words, rather than measuring an actual distance between assets, proximity or another measure of spatial, temporal, or operational association, between assets can be determined inferentially.

In addition to machine location, it will be recalled that what a machine asset is intended to be doing can be considered in gathering, quantifying, or reporting performance metrics. This feature of the present disclosure can be carried out by assigning each of the assets in machine system 10 with a role-based asset tag. Where assets are determined to be in association with one another, such as by way of proximity, it can be determined, inferentially, that an asset-to-asset interaction has occurred by also considering whether the role-based asset tags are in accordance with one another. If the role-based asset tags are not in accordance, it can be determined that no asset-to-asset interaction has occurred. Rather than a positive and explicit determination that no asset-to-asset interaction has occurred, instead machine system 10 might operate by not triggering any performance data acquisition at all where asset tags are not accordant. If an asset-to-asset interaction has occurred, then gathering of performance data can be triggered.

Those skilled in the art will appreciate that gathering and reporting of performance data for machines can sometimes include false positives. For example, load cycles can be counted that did not actually occur, dump cycles can be counted that did not actually occur, or other instances of bad data may be produced that can ultimately affect accuracy of any efforts to track, quantify, and report performance metrics. According to the present disclosure, by employing role-based asset tags as further discussed herein, location information alone can be used to determine that loads have actually been acquired, delivered, transported, dumped, et cetera, without requiring reliance upon on-board monitoring systems, presumption, or other observations subject to error. Other material handling actions than loading actions, such as hauling, distribution, completion, spreading, moisture manipulation, or others can analogously be confirmed or not confirmed according to these principals.

These capabilities can be advantageously applied where certain machines at a work site can take on different roles. It will be recalled that some loaders may work in pit 28 and others elsewhere at the work site. For quantifying and reporting performance metrics, it can be desirable to count loads extracted from pit 28, for example, but not count, or alternatively count, loads handled elsewhere. Loaders 12 and 14 might be assigned role-based asset tags for loading and hauling, and loader 16 assigned an asset tag for load out. The performance criteria of interest for loaders 12 and 14 might be different from the performance criteria of interest for loader 16 in this example. Accordingly, when one of haul trucks 17, 18, or 20 is in proximity to one of loaders 12 and 14, it might be determined that an asset-to-asset interaction has occurred. When one of haul trucks 17, 18, and 20 is in proximity to loader 16 it might be determined that no asset-to-asset interaction has occurred. In this example, each of haul trucks 17, 18, and 20 can also be assigned a role-based asset tag that is accordant with role-based asset tags of loaders 12 and 14, but not accordant with a role-based asset tag of loader 16.

System 40 can determine matching of the role-based asset tags. Matching means consistent or accordant with, not necessarily the same as. In other words, because the theme or role of loaders 12 and 14 matches the theme or role of haul trucks 17, 18, and 20, when the respective haul trucks are in proximity to loaders 12 and 14, or executing segments of a work cycle where it can be inferred that such proximity has occurred, performance data such as load number can be counted toward an operations history for one or more of the assets.

Figure 2:
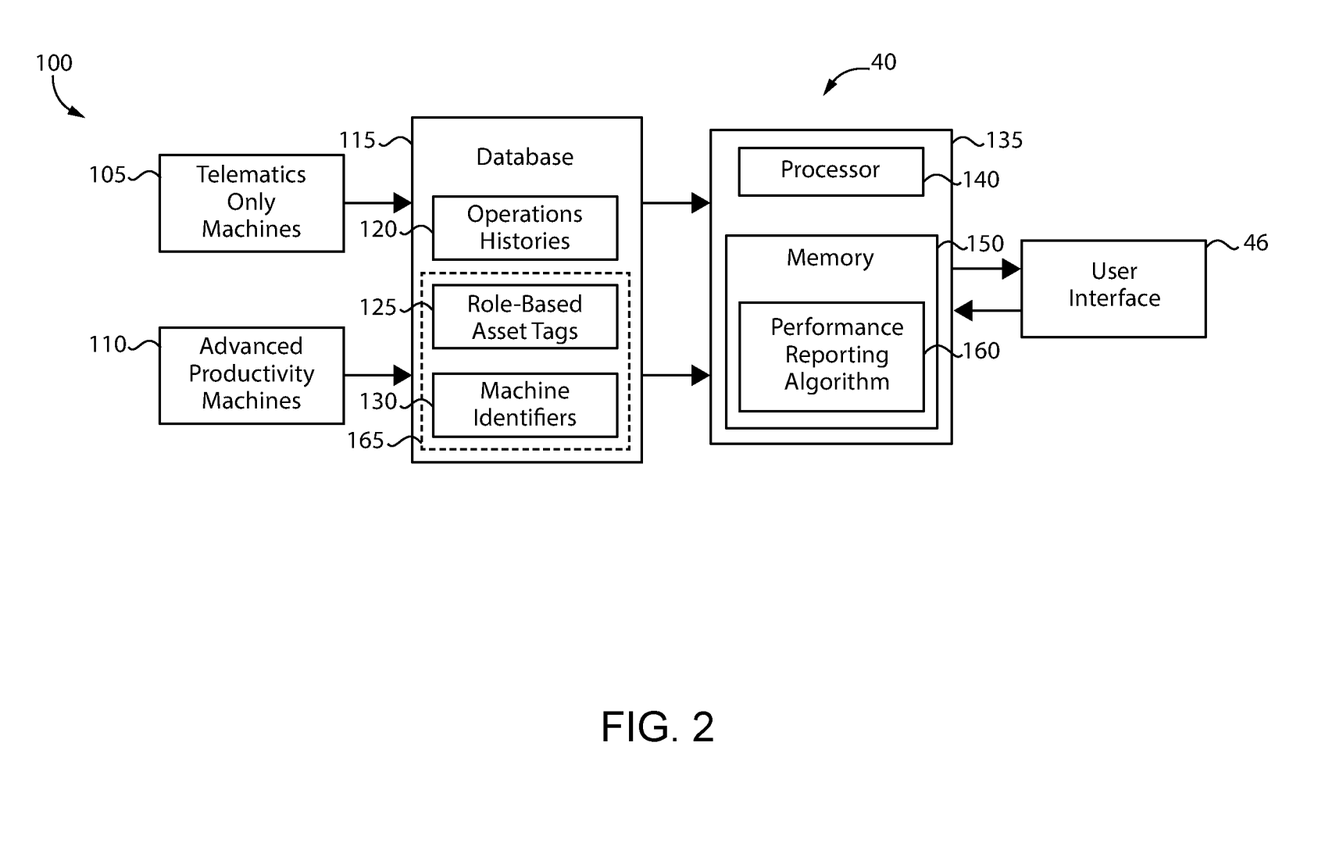
FIG. 2 is a block diagram of elements of an asset performance quantifying and reporting system, according to one embodiment.

Referring also now to FIG. 2, there is shown a block diagram 100, illustrating an example configuration of elements of system 40. A block 105 shows telematics only machines, and a block 110 shows advanced productivity machines, each of which can feed data to a database 115 as discussed herein. Database 115 may be part of or connected to server computer 42, for example. Database 115 stores operations histories 120 for each of the assets of machine system 10. Database 115 also stores role-based asset tags 125 and machine identifiers 130. In one example, role-based asset tags 125 may be associated with machine identifiers 130 in a work plan 165. It will also be appreciated that the role-based asset tags may themselves be stored, for example as a numerical term, that is associated with machine identifiers 130, also a numerical term, for example, in a stored data structure linking addresses of role-based tags 125 to addresses of machine identifiers 130, or some other association between role-based asset tags 125 and machine identifiers 130 might be used. In other words, a machine-readable memory, such as a computer memory of database 115, stores information that establishes a connection between each asset and its assigned role-based asset tag. A user can populate work plan 165 by way of input devices 48 and 50 and/or display 46.

Block diagram 100 also includes a controller block 135. Controller block 135 includes a processor 140, a machine-readable memory 150, and stores a performance reporting algorithm 160 on machine readable memory 150. It will be recalled that machine system 10, and quantification and reporting system 40, includes at least one computer structured to perform the various functions discussed herein, including storing data on database 115, updating data on database 115, and executing performance reporting algorithm 160. Any computer anywhere in machine system 10, or a plurality of computers, can execute these functions. Performance reporting algorithm 160 could include a single algorithm, or multiple algorithms configured as subroutines of another algorithm, for example. Processor 140, and any other electronic control unit contemplated herein, could include a microprocessor, a microcontroller, or any other suitable central processing unit (CPU). Machine readable memory 160, and machine-readable memories resident on database 115, can include any suitable computer readable memory such as RAM, ROM, EEPROMM, DRAM, SDRAM, hard drives, or still others. User interface 46 is shown in a block 46 in block diagram 100, and is in communication with controller block 135 in a generally conventional manner.

From the foregoing discussion, it will be appreciated that system 40 can include at least one computer, coupled with user interface 46 that is or includes a display, and is structured to read, from a machine readable memory, role-based asset tags for each of a plurality of assets. The at least one computer may further be structured to determine matching of role-based asset tags amongst assets that are proximate, at times, during execution of work cycles at a work site. The at least one computer is further structured to determine, inferentially, the occurrence or non-occurrence of an asset-to-asset interaction based upon the matching of the role-based asset tags amongst the assets. The at least one computer is still further structured to populate, on a machine-readable memory, an operations history for one of the plurality of assets based on the occurrence of non-occurrence of the asset to asset interaction. The at least one computer is also structured to output display commands to the display in user interface 46 to display machine asset performance metrics based on the populated operations history. Operations histories 120 can include separate operations histories for each of the assets and/or aggregate histories for machine system 10.

Figure 3:
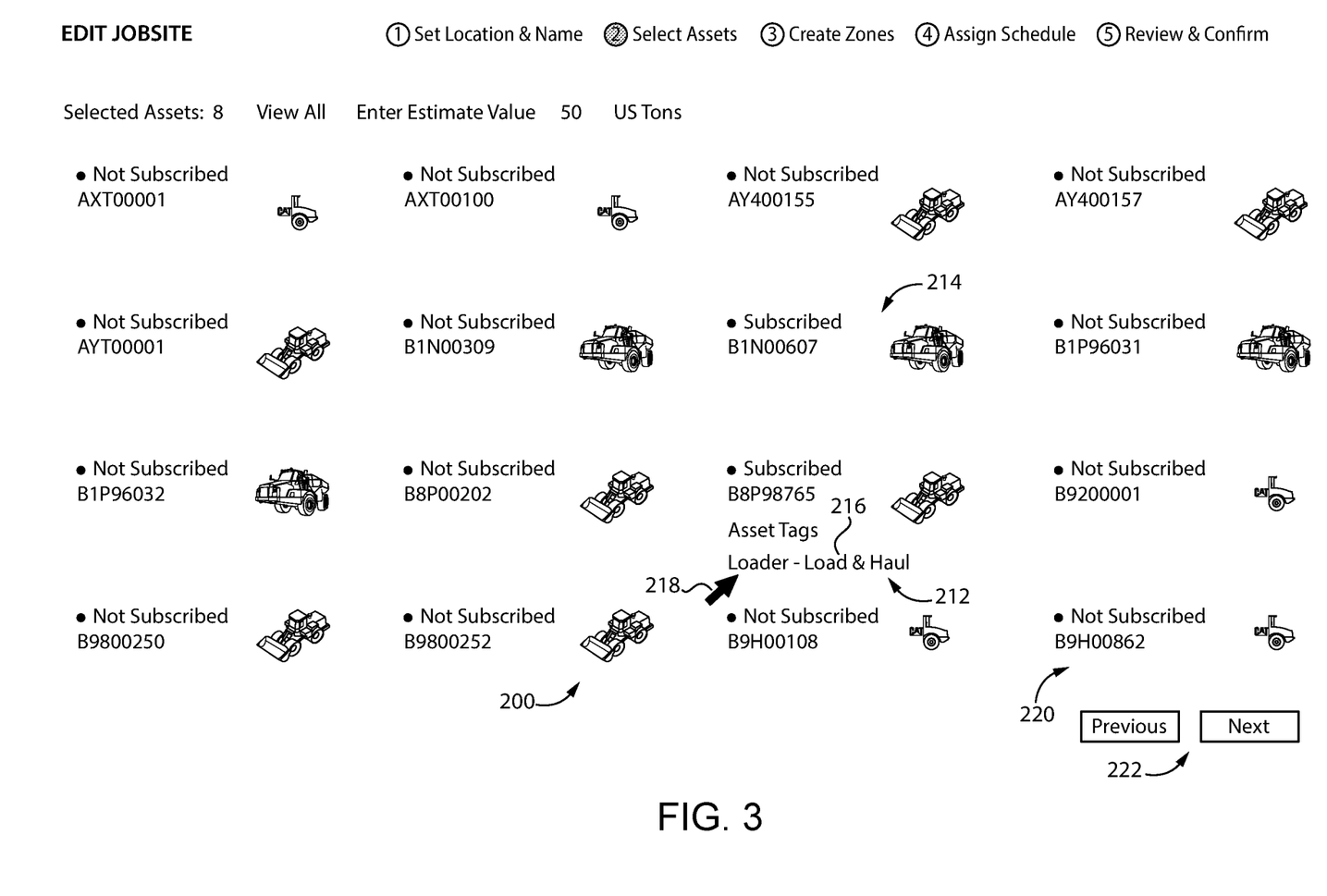
FIG. 3 is a view of a graphical display for user interaction with an asset performance quantifying and reporting system, according to one embodiment.

Referring also now to FIG. 3, there is shown a graphical display 200 illustrating how a user might interact with system 40 to select and assign role-based asset tags. In graphical display 200, a first interactive asset graphic is shown at 212, and a second interactive asset graphic is shown at 214. Each of graphic 212 and graphic 214 represents information associated with a particular asset in machine system 10. For example, it can be seen that the asset associated with graphic 212 is a loader, and the asset associated with graphic 214 is a haul truck. Each of the assets associated with graphics 212 and 214 includes a subscribed asset, with other not subscribed assets shown at other graphics 220. Navigation buttons are shown at 222. In graphical display 200, a user can be understood to be interacting with system 40 to select and assign a suitable asset tag for the loader. A pointer or cursor is shown at 218, where a user can click a configuration button 216 to view a menu of available asset tags, including a finite number of available asset tags. Graphic 212 also illustrates that an asset tag has been predefined for the subject loader, and shows the asset tag Loader-Load & Haul. In one implementation, a finite number of role-based asset tags can include a Hauler asset tag, a Loader asset tag, a Support asset tag, and a Load-Out asset tag.

Figure 4:
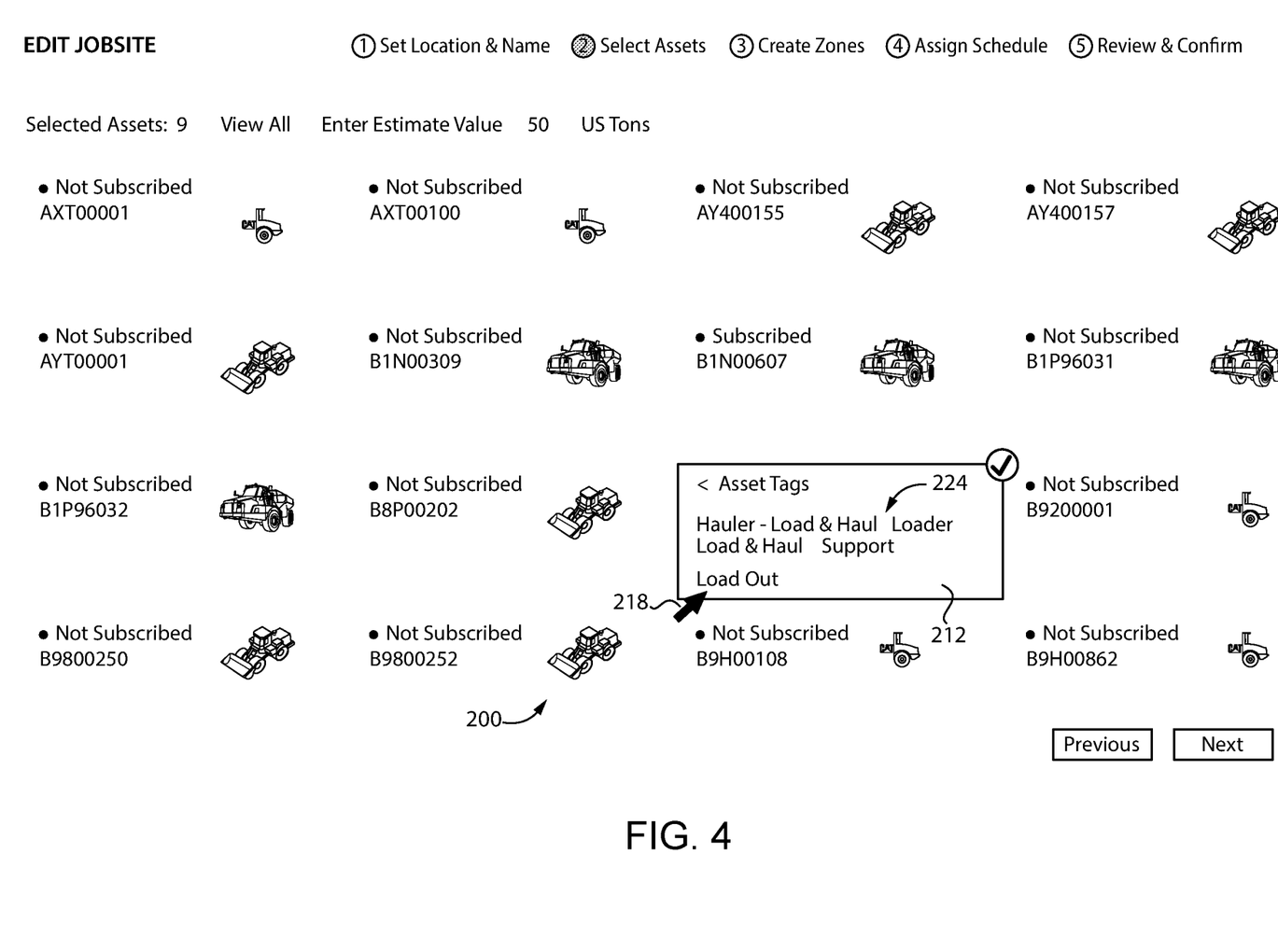
FIG. 4 is another view of the graphical display of FIG. 3.

Referring also now to FIG. 4, there is shown graphical display 200 as it might appear where a user has clicked button 216 to generate a list of available asset tags for the respective loader. There can be seen in graphic 212 a menu showing the available asset tags, including Hauler-Load & Haul, Loader-Load & Haul, Support, or Load-Out. Pointer 218 is shown having selected Load-Out.

It will be recalled that some assets can have different roles at a work site, and a user may wish to utilize the assets differently for different work site plans, at different times throughout a work day, or for other reasons. In transitioning from graphical display 200 as in FIG. 3 to graphical display 200 as in FIG. 4, a user has switched the asset tag assigned by default, based for example on a machine size criterion, for a user specified asset tag. In response to the user specification, system 40 will update the stored role-based asset tag for the associated machine. In other instances, machines might not be associated a priori with any particular asset tag. Those skilled in the art will appreciate other changes from time to time in asset tag assignments that might be made.

Figure 5:
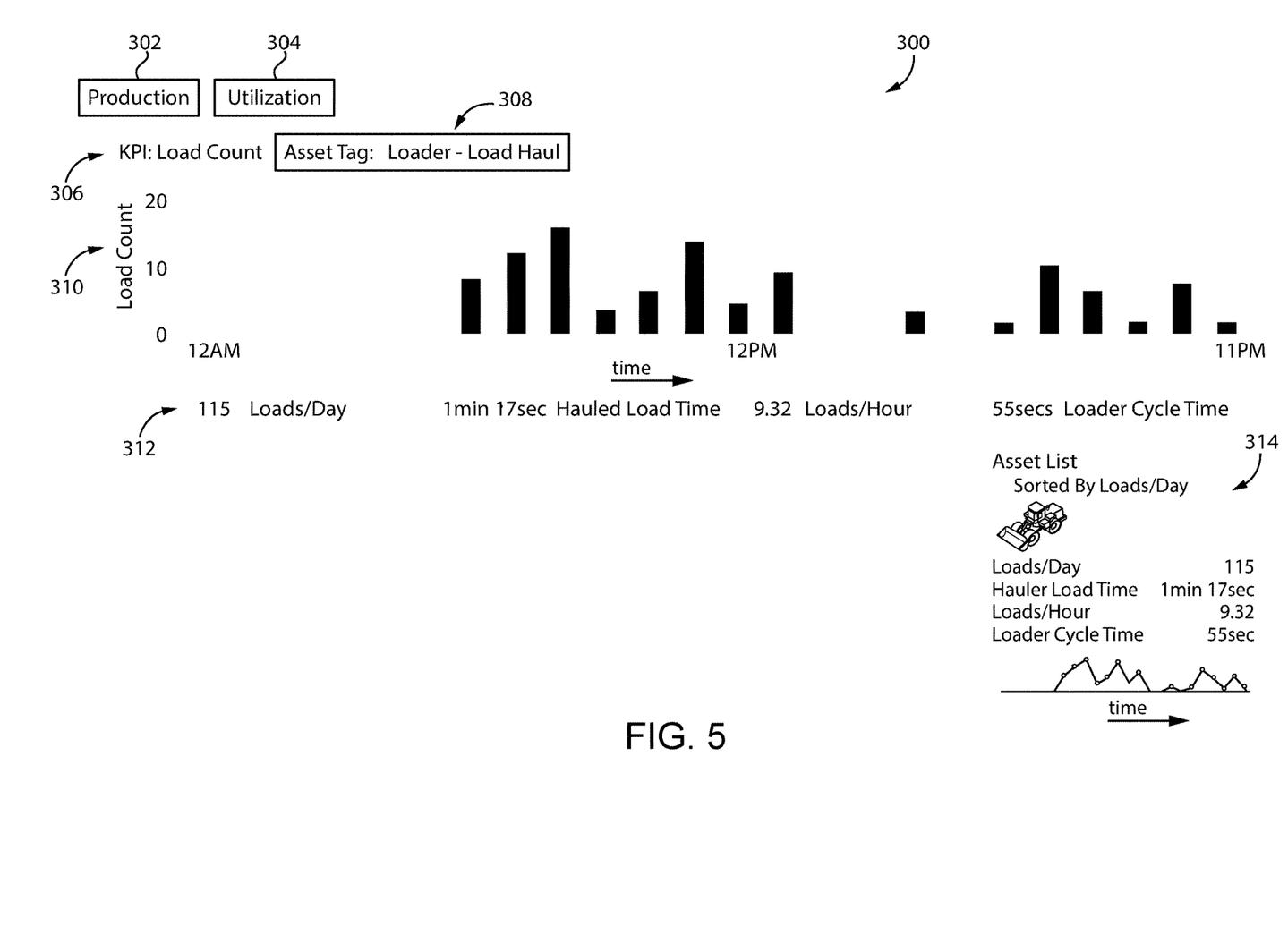
FIG. 5 is a view of a graphical display for reporting performance metrics, according to one embodiment.

Referring now also to FIG. 5, there is shown a performance metric display 300 that might be generated for a particular asset. In graphical display 300 a user may be presented with an option for display of production data and metrics, including loads per day, hauled load time, loads per hour, seconds of loader cycle time, as shown in a display bar 312, or utilization metrics. A user might click on utilization button 304 to switch display graphic 300 to show utilization metrics, for example, percentage of machine on time, percentage of machine travel time, or still others. Key performance indicators (KPI) can be shown such as at 306 where a user has selected load count. The applicable asset tag is shown at 308, where the Loader-Load & Haul asset tag has been selected. Another graphic is shown at 314 listing additional information and an alternative graphical depiction of load count over time. A bar chart is shown at 310 and illustrates load counts per hour over time.

INDUSTRIAL APPLICABILITY

Figure 6:
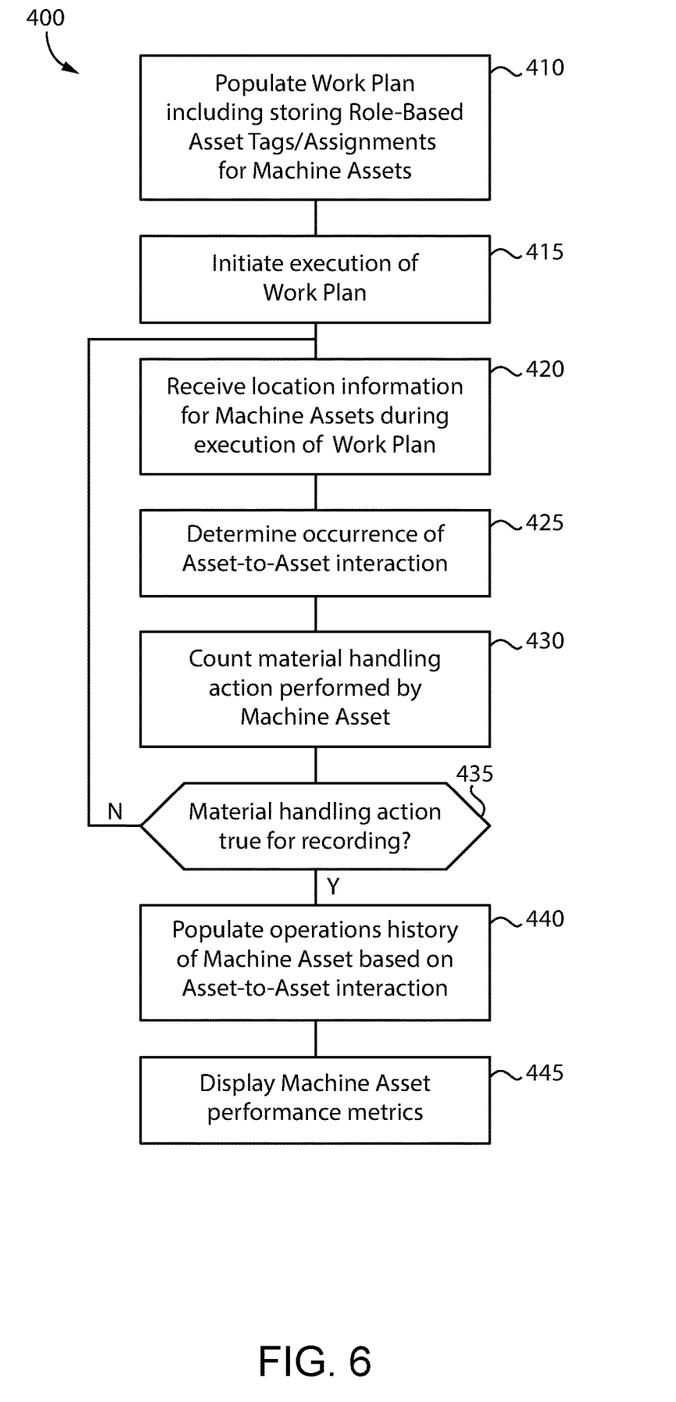
FIG. 6 is a flowchart illustrating example methodology and logic flow, according to one embodiment.

Referring to the drawings generally, but in particular now to FIG. 6, there is shown a flowchart 400 according to one embodiment. Flowchart 100 begins at a block 410 to populate a work plan, including storing, in the work plan, role-based asset tags or assignments of role-based asset tags for a plurality of machine assets. From block 410 flowchart 400 can advance to a block 415 to initiate execution of the work plan. From block 415, flowchart 400 can advance to a block 420 to receive location information for machine assets during execution of the work plan. From block 420, flowchart 400 can advance to block 425 to determine occurrence of an asset-to-asset interaction. It will be recalled that determination of an asset-to-asset interaction can be based upon detected proximity of assets, accordant segments of a work cycle being presently executed by two or more assets, a combination of these factors, or still others. It is also contemplated that the non-occurrence of an asset to asset interaction can be detected.

From block 425, flowchart 400 advances to a block 430 to count a material handling action performed by an asset. In one implementation, counting of the material handling action can include counting a loading action performed by a loader, for example. In other instances, the material handling action could include a hauling action performed by a truck, a carry action performed by a loader, a dump action, or still another. From block 430, flowchart 435 can advance to a block 435 to query whether the material handling action is true for recording? If no, flowchart 400 can return to execute block 420 again, for example. If yes, flowchart 400 can advance from block 435 to a block 440.

The determination at block 435 can include confirming that a counted, or prospectively counted, material handling action is reliable enough data for recording. In some instances, system 40 might determine, inferentially, that an asset-to-asset interaction has occurred, but then acquire additional data to confirm that the detected asset-to-asset interaction is not valid. For example, additional information might be obtained indicating, for example, that while a loader and haul truck were in proximity to one another, the loader's implement system was not actuated. In the example case of loader 12, such an indication could be provided by on-board monitoring systems 58. At block 440, operations history of one or more assets based on the asset-to-asset interaction can be populated, or otherwise modified. From block 440, flowchart 400 advances to block 445 to display machine asset performance metrics as discussed herein.

Figure 7:
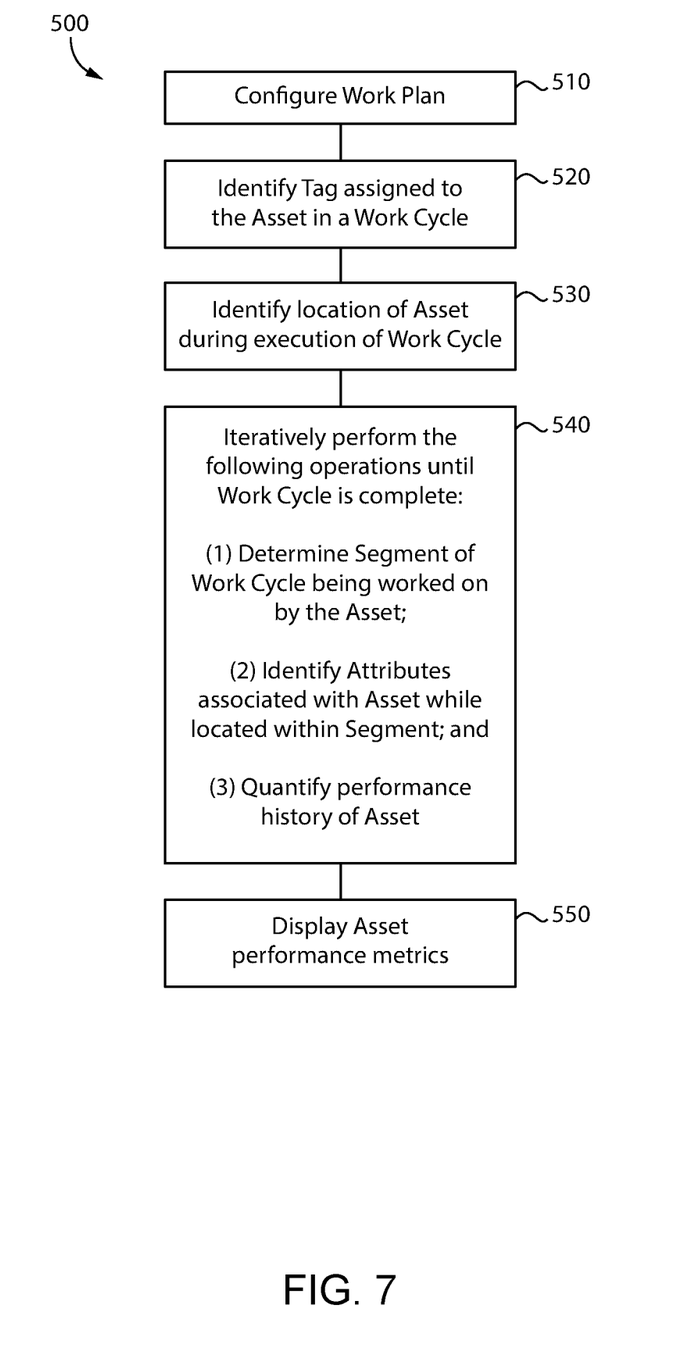
FIG. 7 is another flowchart illustrating example methodology and logic flow, according to one embodiment.

Referring now to FIG. 7, there is shown another flowchart 500 illustrating example methodology and control logic flow, according to one embodiment. Flowchart 500 includes a block 510 where a work plan is configured, including configuring a plurality of role-based asset tag assignments for an asset. From block 510, flowchart 500 advances to a block 520 to identify an asset tag assigned to the asset in a work cycle. From block 520, flowchart 500 advances to a block 530 to identify location of an asset during execution of the work cycle. From block 530, flowchart 500 advances to a block 540 to iteratively perform a plurality of different operations.

The operations performed at block 540 take place until the work cycle is complete, and may include determining a segment of the work cycle being worked on by the asset, based on the asset location and the asset tag that is assigned to the asset in a work cycle. The operations can also include identifying a plurality of attributes associated with the asset while the asset is located within the segment. It will be recalled that the segment of a work cycle can include a spatial location segment, such as a loading segment, a dumping segment, a hauling segment, a grading segment, a leveling segment, a material spreading segment, or still another. The plurality of attributes identified could include the identified asset tag itself and/or other attributes identified from a finite list of possible attributes, including attributes specific to a machine asset such as implement system operation, machine pose, engine state, such as engine speed or engine load, exhaust temperature, ground speed, material handling activities such as loading, dumping, or still others. Fluid pressures in onboard fluid systems of an asset could also be identified, as could attributes associated with a human operator onboard the machine or located remotely. Those skilled in the art will appreciate the possibility of still other attributes associated with the asset that could be identified at block 540. Additional operations performed iteratively at block 540 can include quantifying performance history of the asset based on the identified attributes of the asset while the asset is located within the segment.

From block 540, flowchart 500 can advance to a block 550 to display asset performance metrics on a user interface based on the quantified performance history of the asset. The quantified performance history could include identification and counting of machine asset activities, such as loading activities, dumping activities, or others as contemplated herein. The quantified performance history could also include performance histories of any of the other identified plurality of attributes. The displaying of the asset performance metrics could include displaying the performance metrics periodically, or in real time, as the performance history is developed, or only when a performance history report is triggered by a user, or at some other predefined timing.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of performance reporting for machine assets comprising:
    storing, in a work plan, role-based asset tag assignments for a plurality of machine assets, the work plan being stored in a database remote from the plurality of machine assets;
    receiving location information for the plurality of machine assets, produced during execution of work cycles at a work site;
    inferring, using a controller remote from the plurality of machine assets, a non-occurrence of an asset-to-asset interaction between a first machine asset and a second machine asset of the plurality of machine assets, based on the location information received from the first machine asset and the second machine asset and the role-based asset tag assignments for the first and second machine assets stored in the database, said inferring the non-occurrence of the asset-to-asset interaction being based on the role-based asset tag assignments for the first and second machine assets not being in accordance with one another and the first and second machine assets being within a predetermined proximity zone;
    not acquiring performance data of the first and second machine assets responsive to said inferring the non-occurrence of the asset-to-asset interaction;
    populating an operations history for one of the plurality of machine assets based on the occurrence or non-occurrence of the asset-asset interaction; and
    displaying, on a user interface, machine asset performance metrics based on the populated operations history.

2. The method of claim 1 further comprising:
    inferring, using the controller, an occurrence of the asset-to-asset interaction between the first machine asset and the second machine asset; and
    acquiring the performance data of the first and second machine assets responsive to said inferring the occurrence of the asset-to-asset interaction,
    wherein said inferring of the occurrence or the non-occurrence includes inferring the occurrence of a material handling action performed by one of the first or the second machine assets.

3. The method of claim 2 wherein:
    the populating of the operations history includes counting a number of material handling actions performed by the one of the first or the second machine assets; and
    the displaying of performance metrics includes displaying a productivity metric that is based upon the counted number of material handling actions.

4. The method of claim 2 wherein the material handling action includes one of a loading action, a hauling action, a grading action, a compacting action, or a dumping action.

5. The method of claim 1 wherein said inferring the non-occurrence of the asset-to-asset interaction further includes:
    determining, based on the location information, proximity amongst the first and second machine assets; and
    determining whether the role-based asset tags of the first machine asset and the second machine asset match based on the determined proximity.

6. The method of claim 1 further comprising:
selecting, on the user interface, one of a finite number of different role-based asset tags for each of the plurality of machine assets; and
assigning each of the different role-based asset tags that are selected to one of the plurality of machine assets.

7. The method of claim 6 wherein said selecting of one of the finite number of different role-based asset tags includes switching an asset tag that is assigned by default based on at least one of a machine size, capacity, model, or type criterion, for a user-specified asset tag.

8. The method of claim 6 wherein the finite number of different role-based asset tags includes a hauler asset tag, a loader asset tag, a support asset tag, or a load-out asset tag.

9. A performance reporting system for machine assets comprising:
a user interface including a display; and
at least one computer coupled with the user interface, the at least one computer being different from the machine assets and structured to:
  infer that a first machine asset and a second machine asset of the machine assets are proximate to each other based on location information received from the first machine asset and the second machine asset;
  read, from a machine-readable memory different from the machine assets, role-based asset tags for each of the machine assets;
  determine matching of role-based asset tags amongst the first and second machine assets that are inferred to be proximate, at times, during execution of work cycles at a work site;
  determine, inferentially, an occurrence of an asset-to-asset interaction between the first machine asset and the second machine asset based upon the matching of the role-based asset tags amongst the machine assets and the inference that the first machine asset and the second machine asset are proximate to each other;
  initiate acquisition of performance data of at least one of the first machine asset and the second machine asset responsive to the determination of the occurrence of the asset-to-asset interaction;
  populate, on a machine-readable memory, an operations history for one of the plurality of machine assets based on the occurrence or non-occurrence of the asset-to-asset interaction; and
  output display commands to the display in the user interface to display machine asset performance metrics based on the populated operations history,
wherein the determining, inferentially, the occurrence of the asset-to-asset interaction is based on role-based asset tags for the first and second machine assets being in accordance with one another and the first and second machine assets being within a predetermined proximity zone of the work site that designates the first and second machine assets as proximate to each other.

10. The performance reporting system of claim 9 wherein the at least one computer is further structured to:
receive location information, including the location information from the first machine asset and the second machine asset, for the plurality of machine assets.

11. The performance reporting system of claim 10 wherein the plurality of machine assets include material handling machine assets and the asset-to-asset interaction includes a material handling transfer action.

12. The performance reporting system of claim 11 wherein the at least one computer is further structured to populate the operations history by counting a number of material handling actions performed by the one of the first or second machine assets in a time duration.

13. The performance reporting system of claim 9 wherein the at least one computer is further structured to:
output display instructions to the display of the user interface to display a menu of a finite number of role-based asset tags;
receive a user input on the user interface selecting one of the finite number of role-based asset tags for assignment; and
update a stored work plan based on the selected one of the finite number of role-based asset tags.

14. The performance reporting system of claim 13 wherein the finite number of role-based asset tags includes a hauler asset tag, a loader asset tag, a support, load-out, scraper, compactor, or finish grader, asset tag.

15. A machine system comprising:
a plurality of machine assets, including a first machine asset and a second machine asset, each structured for material handling according to a predefined asset role during execution of work cycles at a work site; and
a performance reporting system, different from the plurality of machine assets, including at least one computer structured to:
  receive location information for each of the plurality of machine assets during execution of the work cycles;
  determine one or more occurrences where the first machine asset and the second machine asset are proximate to each other based on the received location information;
  read, from a machine-readable memory, role-based asset tags for each of the plurality of machine assets;
  determine, inferentially, an occurrence or a non-occurrence of an asset-to-asset interaction between the first machine asset and the second machine asset based upon matching of the role-based asset tags amongst the first and second machine assets when the first and second machine assets are determined to be proximate to each other, at times, during execution of the work cycles;
  initiate acquisition of performance data of at least one of the first machine asset and the second machine asset responsive to the determination of the occurrence of the asset-to-asset interaction, and not initiating the acquisition of the performance data of said at least one of the first machine asset and the second machine responsive to the determination of the non-occurrence of the asset-to-asset interaction;
  populate an operations history for one of the first or second machine assets based on the determined occurrence or non-occurrence of the asset-to-asset interaction; and
  output display commands to a display in a user interface to display machine asset performance metrics based on the populated operations history.

16. The machine system of claim 15 wherein the plurality of machine assets includes at least one loader machine and at least one hauler machine.

* * * * *